April 6, 1965 E. J. RABENDA ETAL 3,177,471

FILE INTERROGATOR

Filed Sept. 12, 1960 8 Sheets-Sheet 1

FIG. I.

INVENTORS
Edward J. Rabenda
Eugene E. Marquardt

BY Sughrue, Rothwell, Mion & Zinn
ATTORNEYS

April 6, 1965 E. J. RABENDA ETAL 3,177,471

FILE INTERROGATOR

Filed Sept. 12, 1960 8 Sheets-Sheet 6

United States Patent Office 3,177,471
Patented Apr. 6, 1965

3,177,471
FILE INTERROGATOR
Edward J. Rabenda and Eugene E. Marquardt, Poughkeepsie, N.Y., assignors to International Business Machines Corporation, New York, N.Y., a corporation of New York
Filed Sept. 12, 1960, Ser. No. 55,387
7 Claims. (Cl. 340—172.5)

This invention relates to apparatus for sequentially and/or simultaneously reading columns of punched card data at high speed so as to subsequently compare this data with character by character information being read directly from a relatively high speed storage medium, such as magnetic tape. More particularly, the invention provides means for indicating equality of a card character and a tape character, with further means for transmitting the equality indication as well as the card characters and the tape character to utilization circuits. The file interrogator circuitry disclosed herein may be adapted for use in a tape data selector of the type disclosed and claimed in the pending Edward J. Rabenda et al. U.S. patent application, Serial No. 648,371, filed March 25, 1957, now Patent No. 3,040,300, and entitled "Data Selector." The above-identified E. J. Rabenda et al. U.S. patent application is of common assignee with this application and for convenience is hereafter referred to as Application A.

Present day data processing systems may group a large amount of information in a single record. Each record may be of variable length; the information within each record may be a variation of word length; and no codes may be employed between records. Due to the great amount of information required for each record, current data processing systems very often utilize large capacity storage means, such as magnetic tapes, drums, or the like, as the basic storage medium. All of these mediums operate at fairly high speed with respect to punched tape or card storage. All the information stored in one or more records may, at some time, be required and used in the preparation of reports, in the performance of calculations prior to the preparation of a report, or in any other data processing operations. However, at other times only certain portions of the data, or information, in one or more records may be required. For example, personnel records each may contain personal information such as date of birth, education, job experience, rate of pay, date of employment, various types of personal deductions, deductions such as taxes required by law, and the like. For payroll preparation, such information as rate of pay, deductions and the like are required, while reports on employees with certain qualifications require information such as education, age, job experience, etc. For insurance purposes such information as age, date of employment, and the like is required.

As noted in the above-identified Application A, in prior art data processing systems flexibility in operation and in the selection of data from magnetic tapes or the like has been limited. Application A discloses and claims structure for comparing characters read from a magnetic tape at typical tape speed with certain characters set up by plug board connections so as to select certain records in accordance with key words or phrases represented by these plug board connections. For example, it might be desired to select from a tape only those records having the same identifying part number or numbers as that set up on the plug board. Each record on the tape is therefore scanned and its characters compared against the characters making up the reference part number so as to read only those records which contain this part number. However, the present invention eliminates the need for a plug board into which the inquiry number is set up, but instead utilizes standard IBM cards into which the inquiry number is punched in the Hollerith code. In the typical IBM card with Hollerith code, each of the eighty columns may contain either a numeric or an alphabetic character, and these columns on the card are successively interrogated at the *same* speed that the characters from the magnetic tape or the like are sequentially read, so as to enable the characters from a tape record to be compared at tape reading speed against the information contained on a particular card. By duplicating the file interrogator equipment, multiple fields on a single card may be scanned simultaneously whose characters are compared against each tape character. This allows multiple inquiry numbers or words to be searched by a single record card without the need for more than one pass over each tape record. This multiple word search procedure is explained and illustrated in the below identified co-pending Application B. The card may be scanned as many times as needed, depending upon the number of records in the tape against which comparison is desired. The results of these comparisons may be used to control the tape operation and/or subsequent utilization of the selected records as described in the above-identified Application A, or as described in co-pending U.S. patent application to Edward J. Rabenda et al., Serial No. 733,188, filed May 5, 1958, and entitled "File Search Data Selector." This second identified application is of common assignee with this application, and for convenience is hereinafter referred to as Application B.

It is therefore an object of the present invention to provide a file interrogator which scans a punched card containing inquiry information at the same speed that data is being retrieved from a high speed storage medium and successively compares card information against storage information.

Another object of the invention is to provide a file interrogator in which means are provided for disabling a comparing means in response to detection of a particular card character.

It is also an object of the present invention to provide a file interrogator which represents the same card character in two different codes.

A further object of the invention is to provide a file interrogator in which multiple fields of a single punched card may be simultaneously scanned by duplicate means, with characters from each being simultaneously compared against characters from a high speed storage medium.

Other objects of the invention will be pointed out in the following description and claims and illustrated in the accompanying drawings, which disclose by way of example, the principle of the invention and the best mode which has been contemplated of applying that principle.

Figure 1:
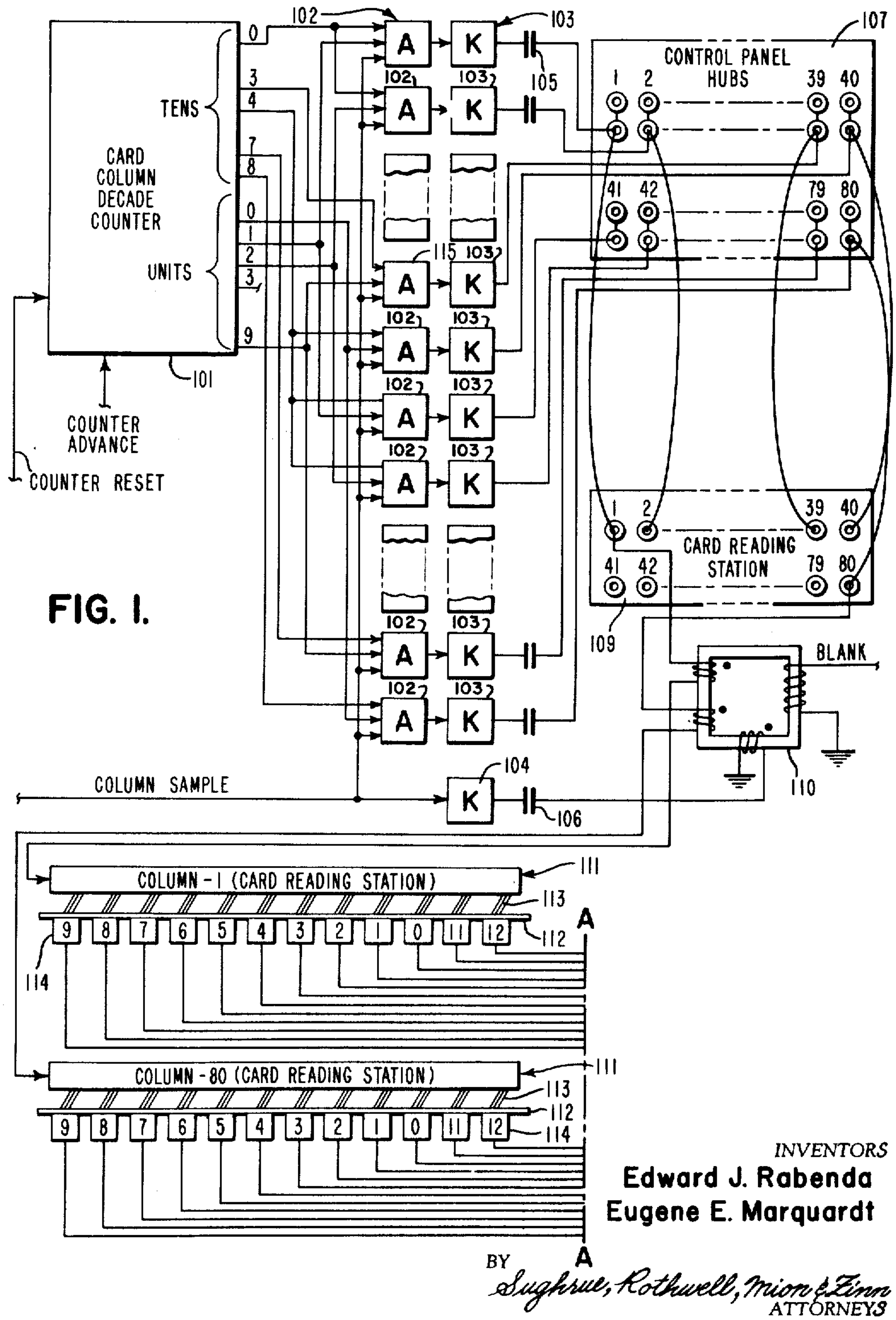
FIG. 1 illustrates a single card sensing station and sequential sampling circuitry associated therewith for scanning only one field at a time.

Referring now to FIG. 1, there is shown in diagrammatic form one reading station for a punched card together with means for sequentially interrogating the columns of a card one field at a time. Card column decade counter 101 has associated with it two groups of output leads. The TENS group contains nine output lines numbered 0 through 8, while the UNITS group contains ten output lines numbered 0 through 9. However, for the sake of simplicity, only certain numbered output lines in each group are actually shown in FIG. 1. The counter provides but one signal on one output line in each group which signifies the particular count contained in the counter. For example, if the count is 1, then the 0 lead from the TENS group has a signal thereon, while the 1 lead from the UNITS group also has a signal thereon. Upon receiving a COUNTER ADVANCE pulse, the counter 101 advances its count by one so that the 2 lead from the UNITS group is now activated, while the 0 lead from the TENS group maintains its signal thereon. COUNTER ADVANCE pulses will step this counter sequentially so that the range of the counter is from 00 to 89. Upon receipt of a COUNTER RESET pulse, counter 101 will be reset to 00 which is signified by the presence of signals on the 0 lead from the TENS group and the 0 lead from the UNITS group. In practice, a COUNTER RESET pulse will be received when the count reaches 80, since there are but 80 card columns. Such a counter may take a variety of forms and could consist of any well known two-decade counter having ten stages in the units decade and nine stages in the tens decade with carry-over between the decades. Conversely, the counter may be of the binary decimal form in which there are but four stages in each decade with a binary-to-decimal translating network for each decade for providing the two groups of decimal outputs from the counter as shown in FIG. 1. Such counters are well known in the art and their details will therefore not be shown.

The output leads from counter 101 are connected as inputs to a group of eighty AND gates 102 such that only one AND gate will have its two uppermost input leads energized during any count in counter 101. A COLUMN SAMPLE pulse is applied to all eighty AND gates 102 so that it passes through and appears as an output only from this AND gate which has these inputs conditioned. For example, if counter 101 contains a count of 39, then only AND gate 115, which has one input connected to the 3 lead from the TENS group and another input connected to the 9 lead from the UNITS group, is enabled to pass the COLUMN SAMPLE pulse when it arrives on its third input. In this way, then, the COLUMN SAMPLE pulse is directed to but one out of eighty output leads from group 102, although it is applied to all of the AND gates in this group. As indicated before, no AND gate 102 is conditioned when a zero count is present. The COLUMN SAMple pulse is powered at the outputs of the AND gates by a group of eighty cathode followers 103 and is then applied to a group of capacitors 105 which provides D.C. isolation for the cathode follower loads and differentiates the interrogating pulse. Thereafter, the counter is stepped so that the next following COLUMN SAMPLE pulse is directed through a different AND gate.

The eighty output leads from the group of AND gates and cathode followers are connected to eighty control panel hubs 107 in a one-to-one correspondence. From these control panel hubs 107 there are lines connected to hubs at a card reading station 109. As shown in FIG. 1, there may be direct correspondence between the numbered hubs 107 and the numbered hubs at station 109. For example, the first hub on control panel 107 is connected to the first hub at the station, while the thirty-ninth hub on panel 107 is connected to the thirty-ninth hub, and so on. This direct correspondence may be changed since it is merely a programming feature.

A differentiated pulse arriving from one of the capacitors 105 will be directed from its associated control panel hub to the hubs at the card reading station. The use of control panel hubs 107 merely provides a convenient connecting point from which to direct the pulses to more than one reading station if this is desired. From each hub at the reading station, a connection is made to a particular one of 80 columns 111 of reading brushes 113 also located at the reading station. A typical IBM card containing the Hollerith code consists of eighty columns with twelve index points contained in each column. In order to designate a particular character, perforations are made at one or more index points within a column depending upon whether the character is numeric or aliphabetic. Since the card is electronically interrogated, the card 112 is initially placed completely into a reading station and is there held stationary until its interrogation is completed. This requires the use of eighty columns of brushes at a reading station, each column containing twelve brushes with one brush for each index point within that column. Wherever a hole is punched at a particular index point within a column, the brush associated with that index point will extend through the hole and connect to a contact 114 on the opposite side of the card 112. Therefore, when a differentiated COLUMN SAMPLE pulse is applied in common to all of the brushes in a particular column, the pulse will appear at one or more of the output contacts 114 from that column depending upon the presence of perforations at the index points. If no hole is punched within a card column, then no output signal can appear at any of contacts 114 from that column in the reading station. For the sake of simplicity, only two brush columns at the reading station are shown in FIG. 1, but it is to be understood that there are eighty such columns. Since pulses are applied to hubs 109 at the reading station in sequence from control panel hubs 107, it is seen that the card columns at the reading station are sampled in sequence.

Figure 2:
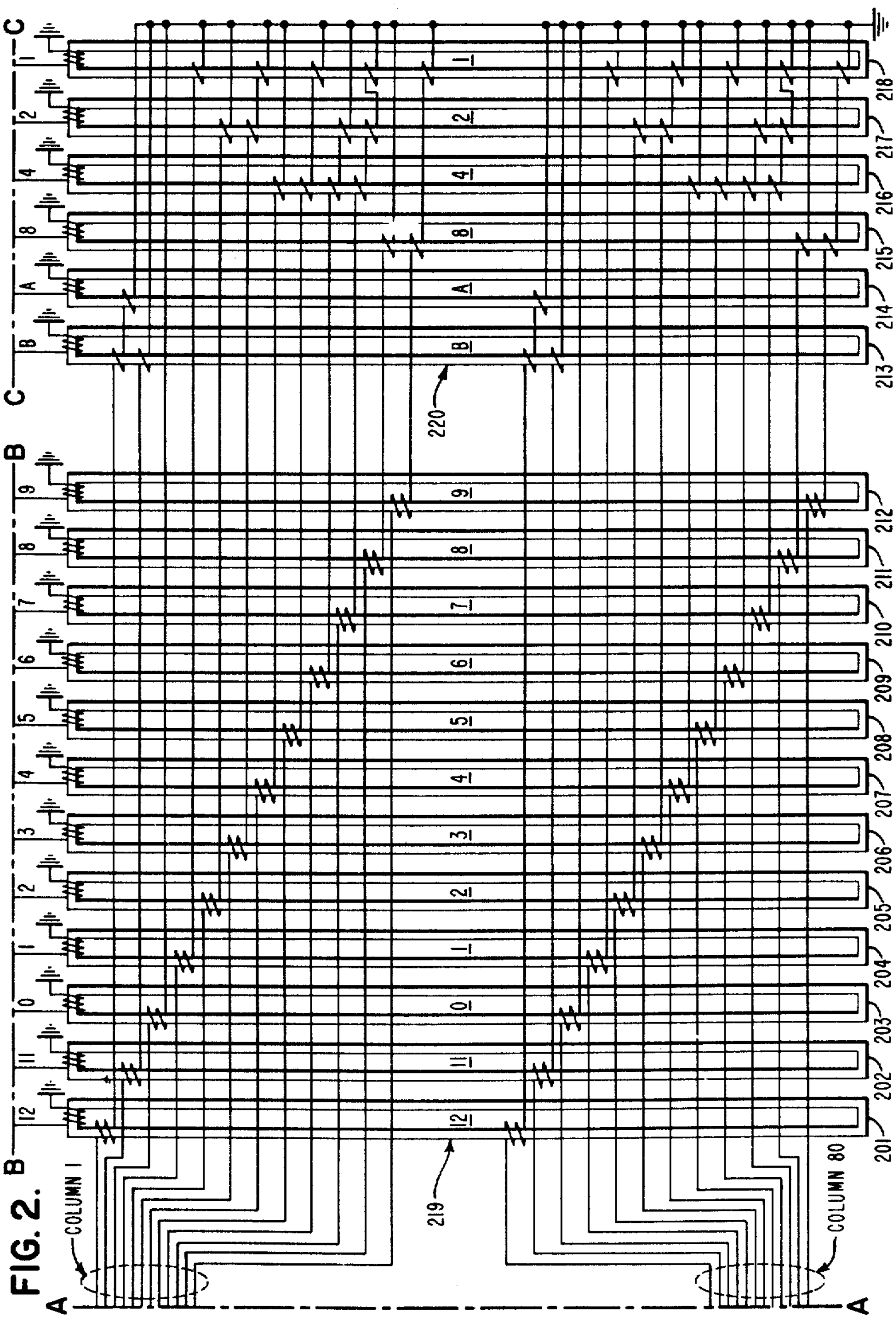
FIG. 2 shows the inductive sensing circuitry used in the present invention.

Each contact 114 of the brush sensing columns at the reading station is associated with one or more of the inductive sense devices shown in FIG. 2. These sense devices are more fully described and claimed in a pending U.S. patent application, Serial No. 699,080, filed November 26, 1957. There are two groups 219 and 220 of these inductive devices, each device consisting of a transformer core having a plurality of input primary windings and an output secondary winding. In group 219, there are contained twelve sense devices designated 0 through 9, 11 and 12 which correspond to the twelve index points in each card column. Each sense device in group 219 has eighty primary windings, only two of which are shown, which are formed by a group of eighty leads connected to the same numbered contact 114 in each of the eighty brush columns of the reading station. For example, all eighty of the number 12 contacts 114 at the reading station (one number 12 contact in each column) are associated with inductive sensing device 201 in group 219 of FIG. 2. Each of these number 12 contacts is connected to a different primary coil on sensing device 201 so that there are eighty such primary coils on sensing device 201. In like fashion, the eighty number 11 contacts 114 at the reading station are connected to eighty primary coils on sensing device 202. This arrangement is followed with each of the other ten sensing devices 203 to 212 in group 219. However, only one secondary coil is associated with each of the sensing devices in group 219. Therefore, when any card column at the reading station is interrogated by a COLUMN SAMPLE pulse, one or more of the contacts 114 of that column may be energized so as to set up flux in their associated sensing devices in group 219. An output voltage will therefore be induced in the secondary coils of the sensing devices so energized, which thus indicates at which index points in this column perforations appear. Of course, it is not possible to tell which column has been sampled by merely looking at the output of the sense devices in group 219, but this may be discerned from counter 101. It should be noted that the output of the sensing devices in group 219 are indicated in the Hollerith code, so there is no radix translation performed by this group.

Group 220 in FIG. 2 provides a radix translation as well as providing the inductive sensing function. For example, it is noted that the number 12 contact from the first column at the reading station is associated with primary windings on the B and A inductive sensing devices 213 and 214 in group 220. Furthermore, the number 7 contact from the first column is associated with primary windings on the binary 1, 2 and 4 inductive sensing devices 218, 217 and 216. Therefore, if a pulse *a* should appear on contact 12 from column 1, then output pulses will appear on the secondary windings of sensing devices 213 and 214, while a pulse on contact 7 will product output pulses on the secondary windings of sensing devices 216, 217, and 218. Thus, it is seen that decimal 7 from the first card column is represented by three binary signals, each representing binary bits of 1, 2, and 4 which added together produce the decimal result of 7. Furthermore, the detection of alphabetic characters will also produce a binary decimal translation effect in a well known fashion in that the A and B zone signals are generated in conjunction with the binary 1, 2, 4, or 8 signals at the output of group 220. It should be understood that the contacts 114 of all of the brush columns at the reading station are associated with the sense device of group 220 in the same fashion as are the contacts of columns 1 and 80, which are the only two shown for the sake of simplicity.

It is therefore seen that at the time that a card column at the reading station is sampled, the inductive devices in groups 219 and 220 will simultaneously provide a Hollerith output and a coded binary output, respectively. Furthermore, in the event that there is no perforation in the card column being sensed, an output signal is obtained which represents a BLANK. This is performed by the inductive sensing device 110 shown in FIG. 1. Each of the eighty leads from the reading station hubs 109 to their associated brush columns also traverse sense device 110 so as to form eighty primary coils thereon. The dots associated with these eighty primary windings, only two of which are shown, signify the direction of flux set up within the core when current flows through any one of the eighty primaries. Further associated with sensing device 110 is another primary coil which always receives the COLUMN SAMPLE pulse from amplifier 104 and capacitor 106. The dot associated with this coil signifies that the flux set up in the core due to current therein opposes or bucks the flux set up by current in any one of the above-described eighty primary coils which are connected between hubs 109 and brush columns 111. Upon occurrence of a COLUMN SAMPLE pulse, flux is set up within sensing device 110 which will provide a BLANK output at its single secondary winding if there is no current in any of the eighty primary coils associated with the column sensing brushes. However, if there is a perforation in the card column being sensed, then a circuit is completed and current flows through one of the primary coils associated with the inductive sense device. This will prevent a change of flux in the core, and thereby prevent an output voltage from being induced in its secondary coil.

Figure 3:
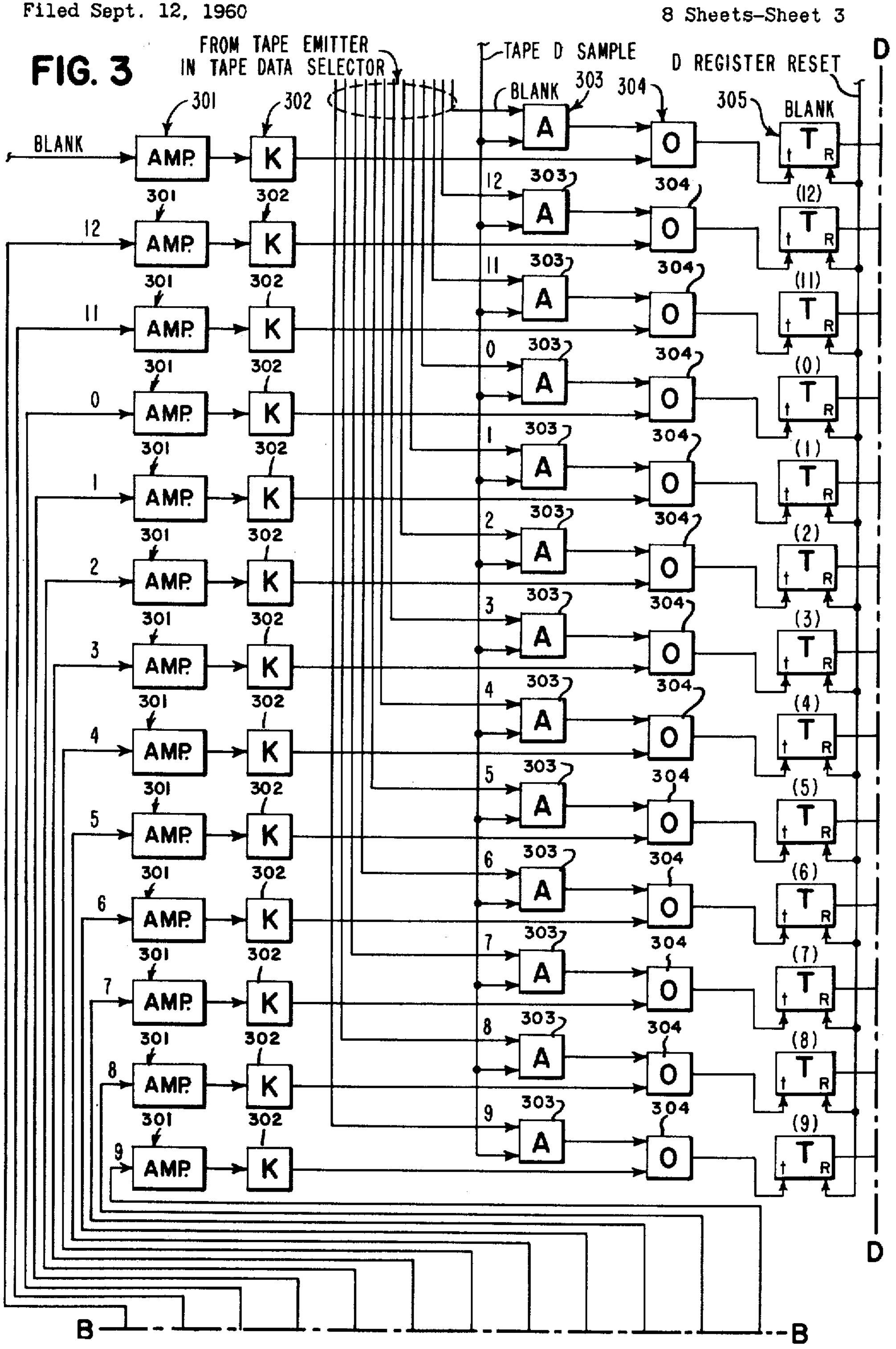
FIG. 3 illustrates a decimal register into which card and tape characters are placed which also acts as an equality detecting circuit.

Referring now to FIG. 3, there is shown a decimal register consisting of trigger stages 305 which receives characters from both the card and the magnetic tape. The secondary coils of group 219 in FIG. 2 are connected to amplifiers 301 as shown in FIG. 3. Furthermore, the secondary coil from inductive sense device 110 is also connected to an amplifier 301. Outputs from these amplifiers 301 are connected through cathode followers 302 to a set of OR gates 304. The output from these OR gates 304 are connected to respective trigger circuits 305 which compose the decimal register. The T inputs to each of these triggers 305 denotes that upon receipt of a pulse thereto, a trigger is switched from its OFF state to its ON state, or vice versa. In other words, the content of the trigger is complemented. A D REGISTER RESET pulse may be applied to the R inputs of the triggers simultaneously so as to reset all the triggers to their OFF state which prevents an output signal therefrom.

Also acting as a second input to each of OR gates 304 is the output from a set of AND gates 303. Associated with each AND gate 303 is an input lead obtained from the tape emitter hubs which are specifically shown and described in the above-identified Application B. Acting as the other input to each of AND gates 303 is a TAPE D SAMPLE lead on which a pulse is provided at the time that the tape character is to be sampled by the file interrogator. As was explained in connection with input of the card character, the sampling of the tape emitter hubs of the tape data selector will cause OR gate 304 to produce outputs dependent upon the value of the tape character so that a trigger 305 will be switched to another state if a pulse is received at its T input.

In the present invention, the triggers 305 not only act as a register for a card character, from which information can be extracted and read to the tape data selector, but these triggers also act as a comparing circuit in order to determine equality between a card character and a tape character. This function is accomplished by first resetting triggers 305 to their OFF condition, and then inserting a detected card character therein. After a card character has been read into the D register, one or more of triggers 305 will be in an ON condition, while the remainder will still be in an OFF condition. If a TAPE D SAMPLE pulse is now generated so as to send a tape character to the D register, the condition of triggers 305 at the conclusion of this tape sample time will indicate equality or inequality between the tape and card characters. For example, assume that the card character causes trigger 1 in the D register to be switched to its ON state, while all of the other triggers remain OFF. If the tape character subsequently sampled is also a 1, then trigger 1 will be turned OFF and the other triggers will not be affected. Thus, at the end of the tape sample time, all of the triggers will be in their OFF position if both card character and tape character were equal. Conversely, if the characters are not equal, then one or more of the triggers 305 will still be in an ON condition after the tape character has been sampled and sent to the D register. In other words, signals representing the card and tape characters being compared must be sent to the same triggers 305 in the D register in order for all triggers to be in an OFF condition at the end of the tape sample time.

Figure 4:
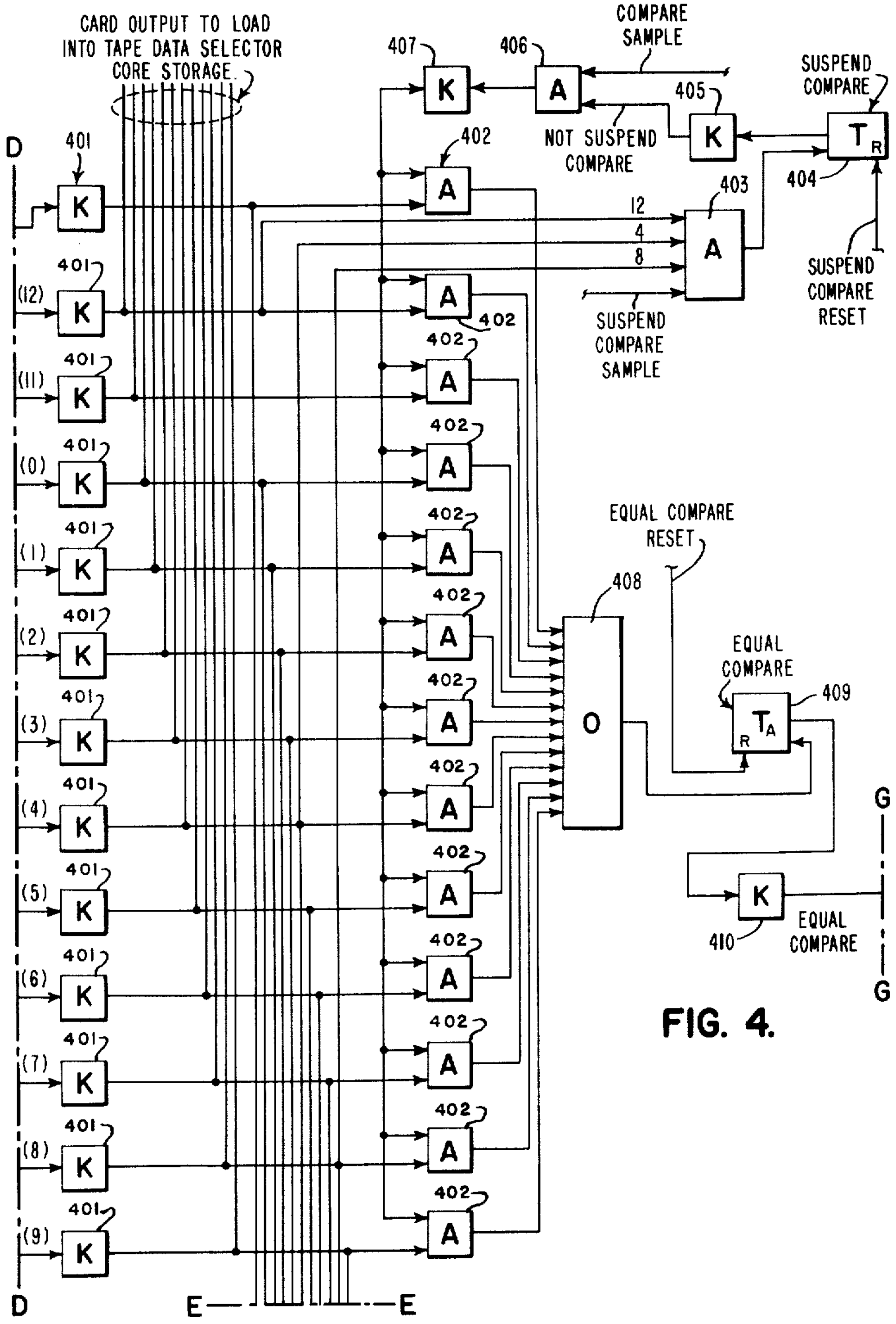
FIG. 4 illustrates sampling circuitry for the compare unit.

The circuitry for detecting the output condition of the triggers 305 in the D register is shown in FIG. 4. Only if a trigger 305 is in its ON condition will a signal appear at its output. The output leads from triggers 305 are directed to cathode followers 401 and from there are sent to respective AND gates 402. Also, provision is made for storing the contents of the D register into the magnetic core storage of the tape data selector. The other input to AND gates 402 is derived from a COMPARE SAMPLE pulse which appears at the output of AND gate 406. Those AND gates 402 which have both inputs raised will produce outputs directed to OR gate 408. Therefore, AND gate 402 provide sampling means to detect the ON condition of any of the triggers 305. Upon occurrence of one or more inputs to OR gate 408, the output therefrom will set trigger 409 to its OFF condition so as to prevent a signal from appearing on its output lead. Trigger 409 is initially set to its ON condition by an EQUAL COMPARE RESET pulse which occurs in time prior to the sampling of the outputs of triggers 305 by the COMPARE SAMPLE pulse. Therefore, if none of the triggers 305 are in an ON condition, no pulse will be derived from OR gate 408. In such case, a signal will continue to be maintained at the output of trigger 409 which indicates that the card character and tape character are both the same.

The COMPARE SAMPLE pulse as above described is applied to AND gate 406. However, depending upon the state of trigger 404, the COMPARE SAMPLE pulse may or may not be gated through AND gate 406. Initially, trigger 404 is set on its ON condition by the SUSPEND COMPARE RESET pulse so as to provide an output to one of the inputs of AND gate 406 through cathode follower 405. However, trigger 404 may be turned OFF by an output from AND gate 403. The output is derived from AND gate 403 when a particular card character is held in triggers 305 at the time that a SUSPEND COMPARE SAMPLE pulse is generated. In the embodiment shown, a card character which turns ON the 12, 4, and 8 triggers 305 will allow AND gate 403 to generate an output at the SUSPEND COMPARE SAMPLE pulse time which will turn OFF trigger 404. With trigger 404 being OFF, a COMPARE SAMPLE pulse occurring subsequently to the SUSPEND COMPARE SAMPLE pulse will not raise the output of AND gate 406, thus preventing the sampling of AND gates 402. In such a case, even if the tape character does not compare with the card character, no output pulse can possibly be derived from OR gate 408, and thus the equal compare trigger 409 remains at its ON condition. Therefore, by use of a special card character the equality comparison between tape and card is prevented. The inputs to AND gate 403 may be varied so as to be derived from different triggers 305 than those shown.

Figure 5:
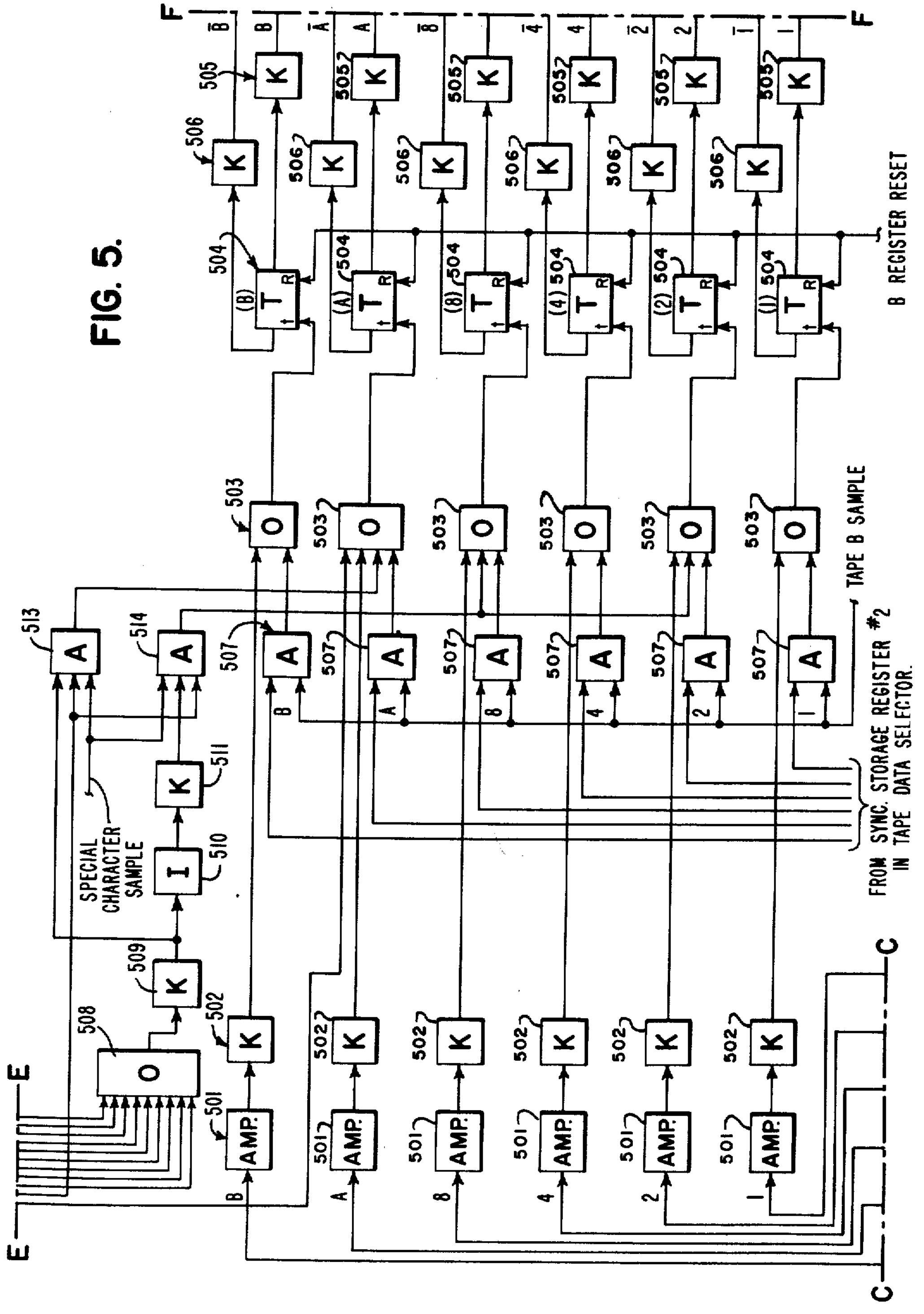
FIG. 5 shows a binary register into which card and tape characters are placed.

Turning now to FIG. 5, the operation of the binary register will now be described. Outputs from the inductive sensing devices of group 220 in FIG. 2 are fed to amplifiers 501 and through cathode followers 502 to provide one on the inputs to OR gates 503. The outputs of OR gates 503 are fed to associated trigger stages 504 which are similar in construction to triggers 305 of FIG. 3. Each pulse to the input T of a trigger 504 will change the conduction state of that trigger from OFF to ON, or vice versa. A B REGISTER RESET pulse applied simultaneously to the R inputs of triggers 504 will cause them to be set to their OFF condition.

Upon applying a COLUMN SAMPLE pulse to a particular column at the reading station, one or more outputs from the sense devices in group 220 may be generated so as to initially set triggers 504 in the B register to a binary coded decimal equivalent of most card characters. However, the binary coded decimal equivalent of certain card characters are not generated by group 220. For example, in the present embodiment the 0 numeric character is represented in Hollerith code on the card by a perforation only at the 0 index point. However, it is represented by a combination of binary 8 and binary 2 bits in the B register, which is indicated by the ON condition of the 8 and 2 triggers. Conversely, a 0 zone character on the card is one having perforations both at the 0 index point and at one of the index points 1 through 9. In the binary register, a 0 zone character must always have an A bit together with the proper combination of the 1–2–4–8 bits according to the value of the digit in the index positions 1 through 9. As noted in FIG. 2, the output line from the 0 contact 114 does not form a primary coil on any of the inductive sense devices in group 220 because of the different bit values required to represent these two 0 characters. The binary code for these characters is provided by the special character circuits shown in the upper left-hand corner of FIG. 5. Since the 0 numeric character from the card is placed in the decimal register of FIG. 3 in the Hollerith code, only the 0 trigger 305 is turned ON at the COLUMN SAMPLE time and provides an output therefrom. At the COLUMN SAMPLE time for the 0 numeric character, however, none of the binary triggers 504 in the binary register are set ON because none of the sense devices in group 220 are energized. The output of the 0 decimal trigger 305 is fed to one of the inputs of AND gate 514. Another input to AND gate 514 is derived from a cathode follower 511 which in turn is fed from an inverter circuit 510. The input to inverter 510 is derived from a cathode follower 509 which in turn is fed from an OR gate 508. Inputs to OR gate 508 are derived from the 1 to 9 triggers 305 in the decimal register. Therefore, in the absence of any output signals from the 1 to 9 triggers 305, which will be the case when a 0 card character represents a 0 numeric character and not a 0 zone character, there will be no input to inverter 510, which will thus provide an output signal therefrom. This output is fed to one input of AND gate 514. Since the 0 trigger in the decimal register is ON at this time, then another input to AND gate 514 is up. On occurrence of the SPECIAL CHARACTER SAMPLE pulse, an output is derived from AND gate 514 which will set ON the 8 and 2 triggers 504 in the binary register representing a 0 numeric character.

Conversely, if the card column contains a perforation in the 0 index point as well as a perforation in any of the index points 1 through 9, then a 0 zone character is represented and it is always desired that the A zone trigger 504 in the binary register be turned ON, as well as those binary triggers whose combination represents the digit in the 1 through 9 group. This function is not completely provided by the sense units in group 220, but is performed in part by the special character circuit of FIG. 5. It is noted that the output of the 0 trigger in the decimal register is further fed to one of the inputs of AND circuit 513, and the output of OR gate 508 is also fed to the same AND gate. Therefore, upon occurrence of the SPECIAL CHARACTER SAMPLE pulse, there will be an output from AND gate 513 if the card column contained a perforation at the 0 index point as well as a perforation at any of the index points 1 through 9. The output of AND circuit 513 is provided to the proper one of OR circuits 503 so as to set ON the A zone trigger 504 in the B register. However, the sense units in group 220 previously have been responsive to the perforation at index points 1 through 9 so as to set certain of the triggers 1–2–4–8 in FIG. 5.

If the card column being sensed does not contain any perforations at its index points, then a BLANK signal will be generated by sense device 110 which turns ON the BLANK trigger 305 in the decimal register. This in turn will also set the A trigger 504 to its ON condition, since there is a connection between the two through one of the OR gates 503 as shown in FIG. 5.

In an alternative embodiment, the outputs of the 1–2–4–8 triggers 504 could be monitored by OR gate 508 in order to determine whether a perforation exists at index points 1 through 9. However, the input to OR gate 508 need not be derived from the decimal register of FIG. 3. The use of the BLANK and 0 triggers 305 as inputs to the binary register is convenient because it eliminates the need for extra sensing devices in order to detect a 0 index perforation, or the BLANK condition.

It is also possible to transfer a tape character, which is in the binary code, to the binary register of the file interrogator. As noted in Applications A and B above-identified, the sync storage register 2 in the tape data selector contains the character as read from the tape which is encoded in binary form. If the binary register in FIG. 5 is reset to its OFF condition by the B REGISTER RESET pulse, a subsequent TAPE B SAMPLE pulse will cause the contents of the sync storage register 2 to be gated into the triggers 504 by means of AND gates 507, which are connected to the OR gates 503.

As will subsequently be described in the present embodiment, the triggers 504 in the binary register are always reset before a new character, either from card or from tape, is entered therein. However, they could be used to provide the function of equality detection as do the triggers 305 in the decimal register. Each trigger 504 has two outputs therefrom, one being complementary to the other. When a trigger 504 is in its OFF condition, its right hand TRUE output lead has no signal thereon but its left hand NOT lead may be considered to be up. Conversely, when a trigger 504 is set ON, the right hand TRUE lead is up while the left hand NOT lead is down. Therefore, if the 8 trigger is ON, then the output lead denoted by 8 will be up while the output lead denoted by $\bar{8}$ will be down.

Figure 6:
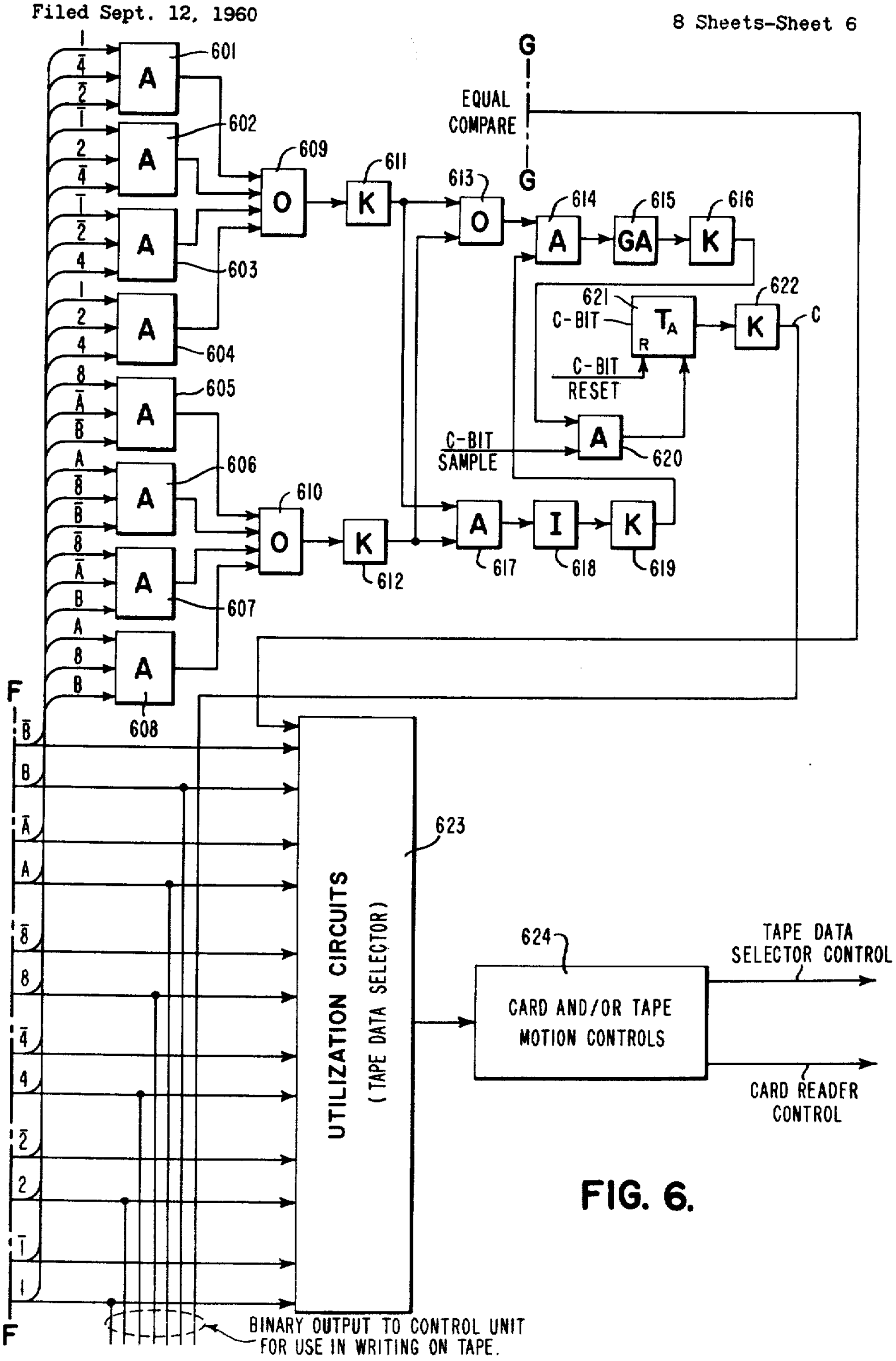
FIG. 6 illustrates a parity bit generator for card information.

In FIG. 6, both the TRUE and NOT leads from triggers 506 are utilized in various ways. When a card character is inserted into the binary register, then it may be desirable to derive a C parity bit for the character. The use of a C parity bit associated with a binary character is well known in the data processing art and will therefore not be described herein. In the file interrogator system of the present invention, an even parity check is utilized. Therefore, a C parity bit is generated for a character only if the number of information "1" bits in the character is odd. This is performed by the circuit in the upper portion of FIG. 6. The outputs from the binary register are divided into two groups, one group consisting of the 1, 2, and 4 bits and their complements, while the other group consists of the 8, A, and B bits and their complements. AND gates 601, 602, 603 and 604 have as inputs various combinations of the 1, 2, and 4 bits, while AND gates 605, 606, 607 and 608 have as inputs various combinations of the 8, A, and B bits. If the number of information "1" bits contained in the first group is odd, then one of the four AND gates 601 through 604 has an output and thus provides an output at OR gate 609. Furthermore, if the number of information "1" bits in the second group is odd, then one of AND gates 605 through 608 has an output which will in turn provide an output from OR gate 610. The outputs of OR gates 609 and 610 are fed through respective cathode followers 611 and 612 so as to provide inputs to OR gate 613. Furthermore, the outputs from OR gates 609 and 610 are fed as inputs to AND gate 617 whose output is then fed to inverter gate 618. The output of inverter 618 is fed through cathode follower 619 to one input of AND gate 614 whose other input is derived from OR gate 613. The output from AND gate 614 is fed through various amplifiers 615 and 616 to AND circuit 620 to whose other input is applied a C BIT SAMPLE pulse. The output of AND gate 620 is fed to the ON input of C BIT trigger 621 whose output is fed through cathode follower 622. Trigger 621 is reset to an OFF condition by a C BIT RESET pulse, and in its OFF condition does not provide an output to cathode follower 622.

In operation, if the total number of "1" bits in the first group is odd, then an output will be obtained from OR circuit 613. In the event that the second group of bits is even in number, then OR gate 610 and AND gate 612 will not be up and an output will thus be obtained from inverter 618, allowing AND gate 614 to pass a signal which will condition AND gate 620. Upon receipt of a C BIT SAMPLE pulse, AND gate 620 is sampled so as to trigger C bit trigger 621 to its ON state and thus produce a pulse representing a C parity bit. It should be noted that if the first group is odd and the second group is even, then the sum of the bits in these groups, which make up the total character, will be odd and therefore the generation of a C bit is required in order to make the total number of bits within the character an even number. Conversely, if the first group of bits is even in number while the second group of bits is odd, then OR gate 613 will again produce an output to AND gate 614, while inverter 618 will produce an output due to the fact that both inputs to AND gate 617 are not present. In such a case a C bit will again be generated in order to produce an even number of bits in the total character. However, if both groups of bits are even or if both groups are odd, then their sums will always be even. In such a case, no C bit generation is desired. This will be so, since in the first case OR gate 613 will be down, and in the second case inverter 618 will be down, thus preventing an output from AND gate 620 which would turn on trigger 621.

The outputs from the binary register may be fed to other circuitry 623, not here shown in detail but fully described in Applications A and B for use in controlling the card or tape motion in a manner there described. For example, it might be desirable to compare the relative magnitude of the card and tape character in another comparing circuit. In such a case, the card character would first be transferred to the comparing circuit from the binary register, and then the tape character would be transferred to the comparing circuit from the binary register. The operation or construction of these utilization circuits are not shown inasmuch as they do not form a portion of this invention.

Figure 7:
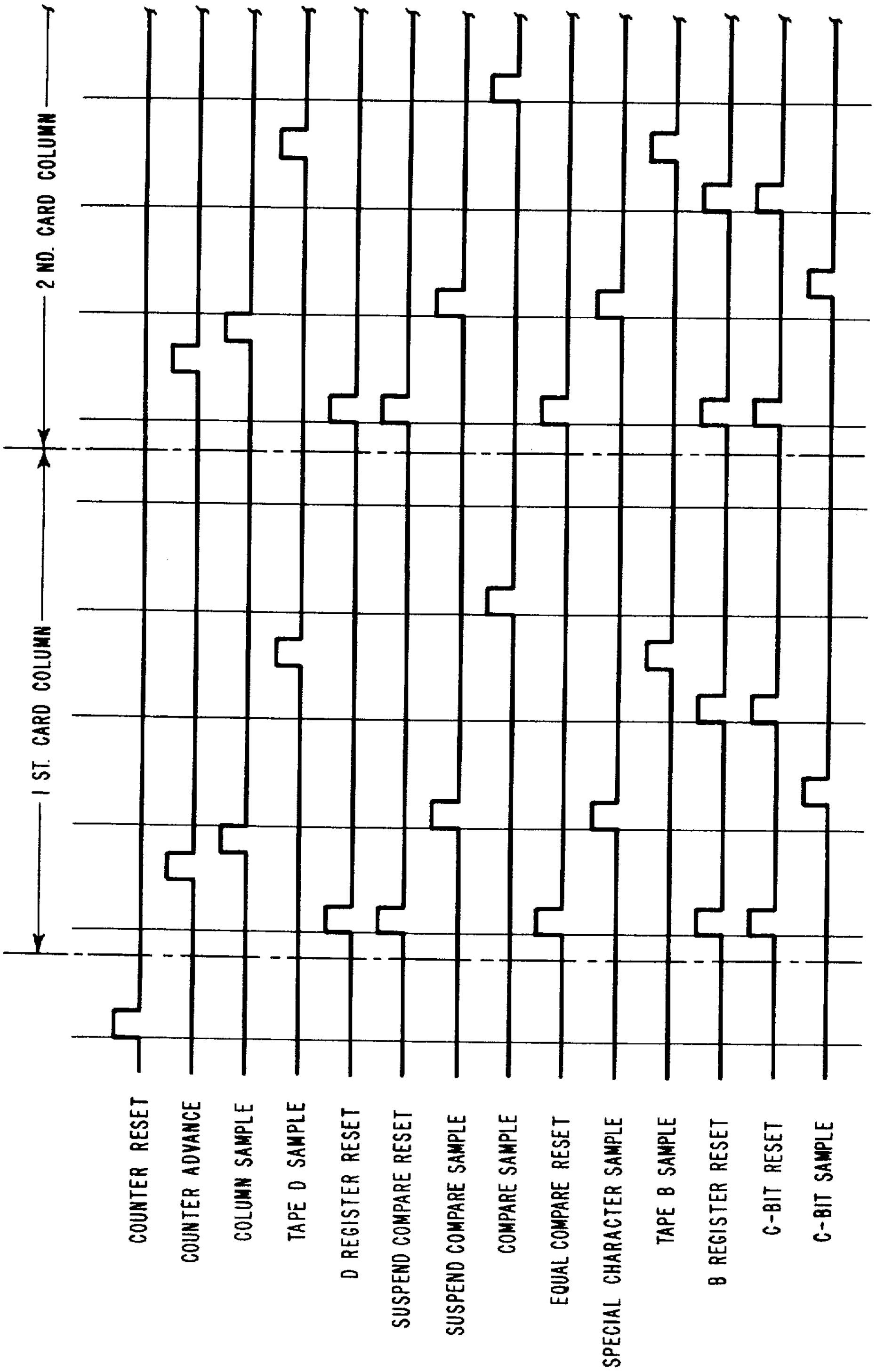
FIG. 7 is a timing chart of the gating signals applied to the system in FIGS. 1 through 6.

A proposed system operation of the invention will now be described with particular reference to the timing chart of FIG. 7. It is to be understood that the sequence of the gating pulses shown in FIG. 7 is merely representative of a preferred use of the invention, and should not be construed as being a limitation of this structure. Furthermore, the gating pulses shown in FIG. 7 can be produced by circuitry in the above-identified Applications A and B, or may be produced by other circuitry which would be within the skill of one versed in the art to construct in accordance with the function to be performed by the invention.

Assuming now that a card has been inserted into the reading station by means not shown, it is desired to interrogate each of its columns in succession and compare the characters derived therefrom with characters successively read from a moving magnetic tape. A COUNTER RESET pulse is generated which resets decade counter 101 to its 0 state. It should be noted that no AND gate 102 is conditioned by the outputs from the decade counter when a 0 count is in the counter. Reset pulses are then generated which reset the D register triggers 305, the suspend compare trigger 404, the equal compare trigger 409, the B register triggers 504, and the C bit trigger 621. Thereafter, in conjunction with the tape reader, a COUNTER ADVANCE pulse is generated so as to step counter 101 to its count of 1. Almost immediately thereafter, a COLUMN SAMPLE pulse is generated which passes to the control panel hub number 1 on panel 107. It should be noted here that the COLUMN SAMPLE pulse is sufficiently delayed with respect to the COUNTER ADVANCE pulse in order that any interdecade carry within counter 101 will have time to increase the count of the tens decade. This is necessary so that the output from counter 101 is stable and reflects the true count therein by the time that the COLUMN SAMPLE pulse arrives.

The COLUMN SAMPLE pulse is fed from the control panel hub 107 to the first hub 109 of the reading station, and from there to the first brush column. If there are any perforations within this first card column, one or more brushes extend therethrough and connect associated contacts 114. Circuits are closed so that current of the COLUMN SAMPLE pulse will flow in the primary coils of associated inductive sensing devices of groups 219 and 220 in order to generate outputs at their secondary coils. Therefore, one or more triggers 305 in the decimal register will be set to an ON position at this time, while one or more triggers 504 in the binary register may be set to their ON position. If no holes are detected in the first column, then a BLANK pulse is generated by sense device 110 which sets the BLANK trigger 305 in the D register. The turning on of the BLANK trigger also would cause a signal to be sent to the input of the A trigger 504 in the binary register. Furthermore, if the card character requires representation by a special binary code, then none of the triggers 504 in the binary register will be turned on at the COLUMN SAMPLE pulse time, but must await generation of the SPECIAL CHARACTER SAMPLE pulse at AND gates 513 and 514. This SPECIAL CHARACTER SAMPLE pulse occurs after the COLUMN SAMPLE PULSE and turns on appropriate triggers 504 in the binary register if a special card character has been detected. At the same time, the decimal register may be sampled by the SUSPEND COMPARE SAMPLE pulse in order to determine whether an equality comparison will subsequently be made. The SUSPEND COMPARE SAMPLE pulse samples AND gate 403 to determine if the card character just placed into the decimal register requires that trigger 404 be turned OFF.

Since the card character is definitely contained in the binary register after the SPECIAL CHARACTER SAMPLE pulse has been generated, a C parity bit signal for this card character is now generated if such is required. A C bit sample pulse is thereupon applied to AND gate 620 so as to set C bit trigger 621 on its ON position if the total bit count is odd. After the C BIT SAMPLE pulse arrives, the card character in the binary register may now be fed, together with its C bit, to the magnetic tape on which it may be stored. Also, the character may be sent to the other utilization circuits. Furthermore, it may now be desirable to load the tape data selector core storage with the card character as found in the decimal register.

The tape character, which had been simultaneously read and temporarily stored from tape along with the card character, is now sampled to determine whether equality between the two characters exists. Before this is done, however, it is necessary to reset the binary register so that the binary representation of the tape character from the sync storage register No. 2 in the tape data selector may be entered into the binary register in its correct form. The binary register would not be reset if a binary equality detection was to be made. Therefore, the B REGISTER RESET pulse is generated, together with the C BIT RESET pulse that turns off the C bit trigger 621 if it had been previously turned on by the C BIT SAMPLE pulse. Thereafter, the TAPE D SAMPLE pulse is generated which samples AND gates 303 so as to direct the tape character from the tape emitter hubs to the decimal register. At the same time, a TAPE B SAMPLE pulse would place the tape character into the binary register. If tape character is equal to the card character previously placed in the decimal register, then those triggers 305 in the decimal register which had been turned ON by the card character will be turned OFF by the incoming tape character. After generation of the TAPE D SAMPLE, then a COMPARE SAMPLE pulse is generated so as to sample the outputs from triggers 305. Assuming that the card character previously read into the decimal register did not require a suspension of the comparing cycle, so as to turn OFF trigger 404, the COMPARE SAMPLE pulse will pass through AND circuit 406 and so sample the AND circuits 402 to which are applied any outputs from the decimal register. In the event that the tape and card characters are equal, then no outputs will be sent to AND gates 402 and thus no output derived from OR gate 408. This means that the EQUAL COMPARE trigger 409 remains ON, it having been turned ON initially at the beginning of the cycle by the EQUAL COMPARE RESET pulse. However, if the tape character is not equal to the card character, then an output will be derived from OR gate 408 which will turn OFF the EQUAL COMPARE trigger so as to bring down its output. The tape character in the binary register and the output of COMPARE trigger 409 may now be sent to the utilization circuits as above described for purposes not a part of this invention. After this has occurred, a second cycle is initiated by a COUNTER ADVANCE pulse which changes the count of counter 101 to a count of 2. Thereafter, a COLUMN SAMPLE pulse samples the second column of the card at the reading station and the cycles continue as above described. After all eighty card columns have been scanned, counter 101 is reset, and the scan initiated again with the same card, or a new card may be sent to the reading station.

As a matter of interest, it should be noted that a COLUMN ADVANCE pulse may not be generated every cycle by the tape data selector. As described in the above-identified Application B, the first card character may be compared with each tape character until equality is detected, after which the following card characters are successively compared with the following tape characters in order to determine equality of words. This provides a floating word search wherein a tape record may be selected by recognizing a word, or a particular sequence of letters, numbers, etc., regardless of their position on the record.

Figure 8:
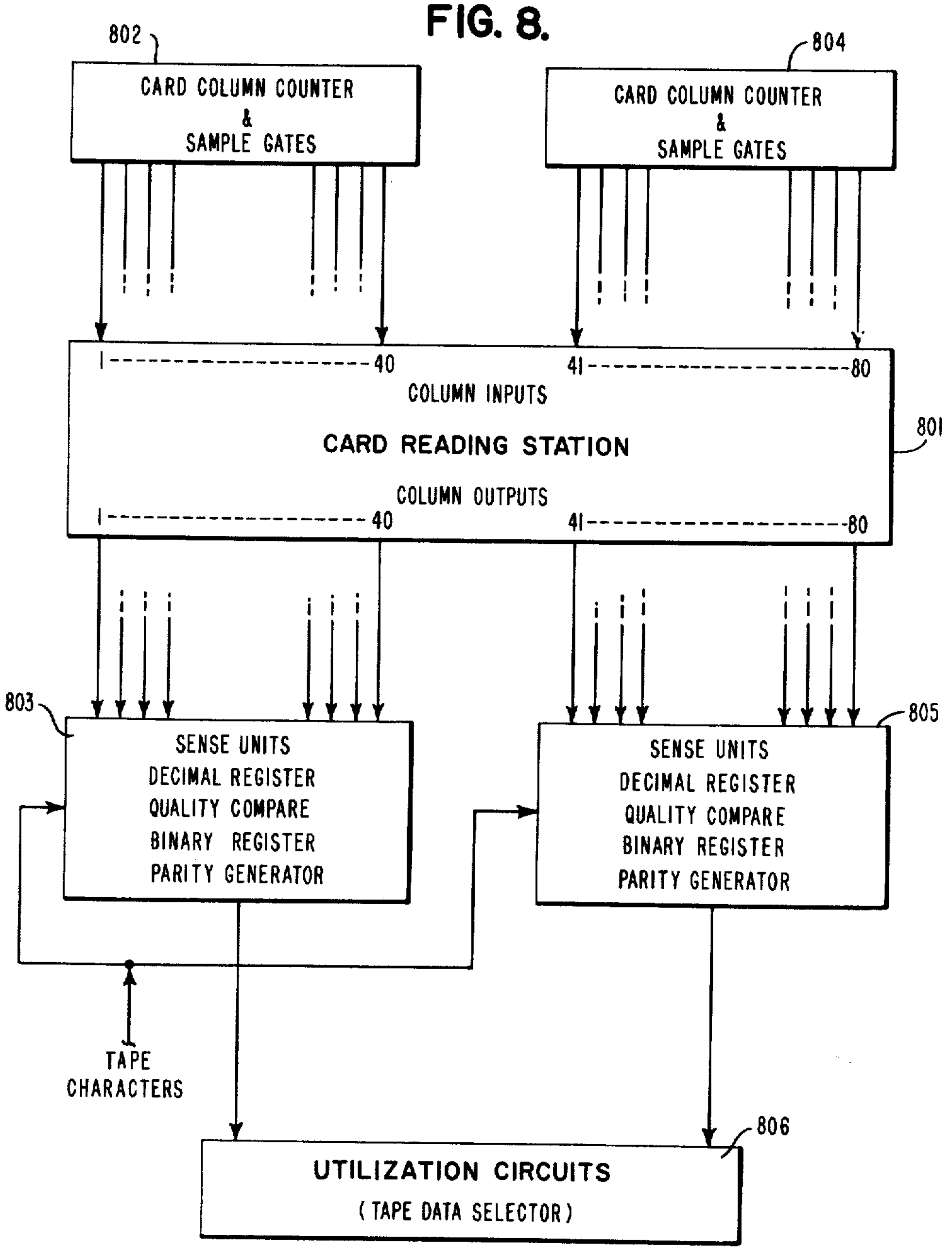
FIG. 8 shows the arrangement for multiple word searching by duplication of the system in FIGS. 1 through 6.

The simultaneous scanning of two or more card fields may be accomplished with an arrangement such as is shown in FIG. 8. While only one card station 801 is utilized, two independently controlled scanning and comparing systems are associated therewith. Card columns 1–40 are scanned in sequence by counter 802 and the outputs therefrom are sensed by the indicated circuits in block 803 which are similar to those shown in FIGS. 2–6. At the same time, counter 804 scans card columns 41–80 which are sensed by another like set of circuits in block 805. Each tape character as it is read is sent in common to circuits 803 and 805 for simultaneous comparison, etc. with the card character from columns 1–40 and the card character from columns 41–80. Counters 802 and 804, together with their associated circuits 803 and 805, respectively, may be operated independently of each other, each as described above in connection with FIG. 7, by the tape data selector. The outputs from circuits 803 and 805, such as the equality indication, etc., are directed to the utilization circuits 806 (tape data selector) for control and other purposes described in above-identified Applications A and B. The arrangement of FIG. 8 therefore allows a search to be made for two words in the tape record during a single scan which are punched into a single card. Obviously, three or more words may be searched in this manner by the addition of other basic file interrogator units each sensing only with certain card columns.

While there have been shown and described and pointed out the fundamental novel features of the invention as applied to a preferred embodiment, it will be understood that omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A file interrogator having first means for reading a first series of characters as they are successively retrieved from a high speed magnetic storage medium, second means for reading a second series of characters as they are successively retrieved from a punched card at the same rate as said first series, and means for comparing characters of said first series with characters of said second series as they are read.

2. A file interrogator according to claim 1 in which means are provided for disabling said comparing means in response to said second means reading a particular character of said second series.

3. A file interrogator according to claim 1 in which said first means reads a character of said first series at a different time than said second means reads a character of said second series against which the character from said first series is to be compared.

4. A file interrogator according to claim 3 in which means are provided for disabling said comparing means in response to said second means reading a particular character of said second series.

5. A file interrogator according to claim 1 in which said first means reads a character of said first series at a latter time than said second means reads a character of said second series against which a character from said first series is to be compared.

6. A file interrogator having first means for reading a first series of characters as they are successively retrieved from a storage medium, second means for reading a second series of characters as they are successively retrieved from a punched card during substantially the same period of time and at the same rate as the reading of said first series, third means for reading a third series of characters as they are successively retrieved from said punched card concurrently with the reading of said second series and at the same rate as said first series, fourth means associated with said second means for comparing characters of said first series with characters of said second series as they are read, and fifth means associated with said third means for comparing characters of said first series with characters of said third series as they are read.

7. A file interrogator according to claim 6 in which said first means reads each character of said first series at a different time than said second means and said third means read each character of said second and third series, respectively, against which said first series characters are to be compared.

References Cited by the Examiner

UNITED STATES PATENTS

| | | | |
|---|---|---|---|
| 2,939,110 | 5/60 | Beattie | 340—149 |
| 2,939,124 | 5/60 | Saxenmeyer | 340—174 X |
| 2,997,696 | 8/61 | Buchholz et al. | 340—172.5 |
| 3,009,636 | 11/61 | Rumble | 235—61.7 |
| 3,062,438 | 11/62 | Farr et al. | 340—172.5 |

MALCOLM A. MORRISON, *Primary Examiner.*

I. L. SRAGOW, *Examiner.*